Oct. 2, 1928.

W. H. A. EMANUEL

FLY SWATTER

Filed Oct. 14, 1926

1,685,990

Inventor
Walter H. A. Emanuel

By Clarence A. O'Brien
Attorney

Patented Oct. 2, 1928.

1,685,990

UNITED STATES PATENT OFFICE.

WALTER H. A. EMANUEL, OF FAIRCHILD, WISCONSIN.

FLY SWATTER.

Application filed October 14, 1926. Serial No. 141,582. REISSUED

This invention relates to new and useful improvements in fly swatters, and has for its primary object to provide a device of this character wherein the handle portion thereof is readily extensible so that flies or other insects at high inaccessable points may be reached by merely extending the handle.

A further object is to provide a swatter of this character that is extremely simple of construction, inexpensive of manufacture, and highly novel and useful for the purposes intended.

Other objects and advantages of the invention will become apparent from the following description taken in connection with the accompanying drawing.

Figure 1:
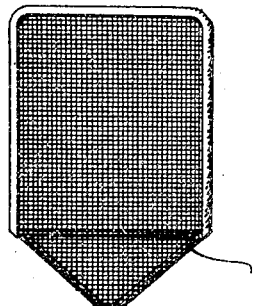
Figure 2:
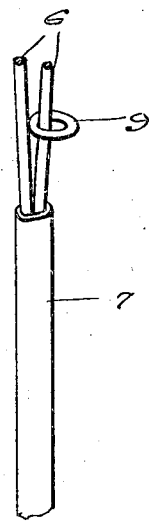

In the accompanying drawing forming a part of this application and in which like numerals indicate like parts:

Figure 1 is a view partly in elevation and partly in longitudinal section of a fly swatter constructed in accordance with the present invention, and Figure 2 is an enlarged fragmentary elevation of the extensible handle at the union between the sections of the handle.

Now having particular reference to the drawing, 5 designates a fly swatter head of conventional design, the inner edge of which is provided with a pair of relatively elongated slightly spaced rods 6—6 that afford the shank portion of the handle for the swatter. The other section of the handle designated by the reference character 7 is in the form of a relatively elongated metallic tube having arranged upon its outer end a suitable hand engaging head 8.

As clearly disclosed in both Figures 1 and 2, I arrange a ring 9 over one of the rods 6 after which the ends of the rods outwardly of the ring are inserted within the tubular section 7 of the handle. The shank and tubular portions are then adjusted with respect to each other so that the desired length of the handle may be secured after which the ring 9 is moved toward the adjacent end of the tube 7 for causing the rod 6—6 to be forced apart directly at the end of the tube 7 which will of course wedge said rods at this point within the tube for preventing the movement of the sections with respect to each other.

It will thus be seen that I have provided a highly novel, simple and efficient form of fly swatter wherein the handle is of such a construction as to permit of the ready extension of the same, and even though I have herein shown and described the invention as consisting of certain detailed structural elements it is nevertheless to be understood that some changes may be made therein without affecting the spirit and scope of the appended claims.

Having thus described the invention, what I claim as new and desire to secure by Letters Patent is:—

1. In a fly swatter of the class described, a swatter head, a pair of parallel spaced elongated rods extending longitudinally from the inner edge of the swatter head, a tubular handle slidably receiving the free ends of said rods, and a ring slidable on one of said rods, said ring wedging the free end portions of the rods in the tubular handle when disposed in one position, said ring further permitting said rods to be moved outwardly of the tubular handle when disposed in another position.

2. In a fly swatter of the class described, a swatter head, a pair of parallel spaced relatively elongated rods extending longitudinally from the inner edge of the swatter head, a relatively elongated tube within which the free ends of the rods are adapted for disposition, a separating member carried by only one of the rods and slidable therealong for expanding the rods at a point directly adjacent the inner end of the tube when said separating member is disposed in one position, the separating member further permitting the rods to be moved outwardly of the tube when said separating member is disposed in another position remote from the inner end of the tube.

In testimony whereof I affix my signature.

WALTER H. A. EMANUEL.